June 12, 1945. G. L. ERICSSON 2,378,071
THREAD LOCK
Filed June 23, 1941
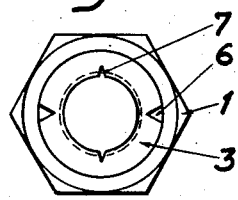
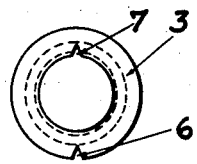
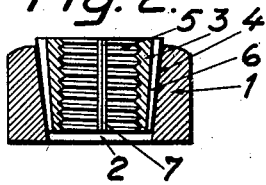
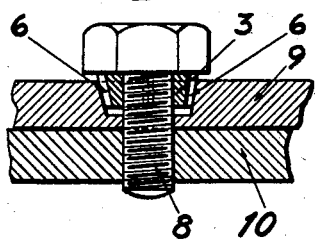
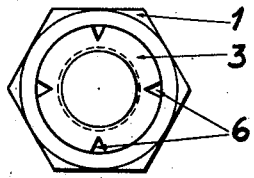
Inventor:
Gustaf Lambert Ericsson,
by
Pierce & Scheffler,
Attorneys.

Patented June 12, 1945

2,378,071

UNITED STATES PATENT OFFICE 2,378,071

THREAD LOCK

Gustaf Lambert Ericsson, Traneberg, Sweden

Application June 23, 1941, Serial No. 399,353
In Sweden February 14, 1941

6 Claims. (Cl. 151—19)

The present invention relates to a device for locking nut and screw joints. It has been proposed before to lock a nut and screw joint by inserting a conical sleeve, threaded on to the screw, between the screw and the nut, plate or the like element of the joint. In order to serve its purpose this conical sleeve should be compressible to a smaller diameter in such a manner that the frictional resistance between the conical surfaces shall always be greater than between the threads and, further, that it shall be established before the frictional resistance between the threads is increased to any considerable extent, whereby a rotation of the conical surfaces relatively to one another is prevented. For this purpose it has been proposed to form the sleeve with a slit extending right through the wall of the sleeve. This proposal, however, has sometimes proved insufficient. The frictional resistance between the threads at times is produced earlier and more violently than the frictional resistance between the conical surfaces, whereby tightening up of the joint is prevented. In order to prevent this, it has been proposed to establish a driving engagement between said surfaces by means of small projections, keys or the like, such arrangement, however, involving considerable extra costs and being moreover time-consuming. Further, such arrangement does not entirely guarantee an effective tightening up of the joint.

The present invention entirely eliminates these drawbacks in a very simple manner, the essential advantage of the same being that the friction between the conical surfaces is determined as desired, whereby the safeguard against the nut working loose can be increased to an extraordinary extent.

The invention is illustrated on the accompanying drawing, in which

Fig. 1 is a plan view of a nut according to the invention.

Fig. 2 is an axial section of the nut according to Fig. 1.

Fig. 3 shows a somewhat altered detail of the nut according to Figs. 1 and 2.

Figs. 4 and 5 show two screw joints according to the invention, and

Fig. 6 shows another embodiment.

In Figs. 1 and 2 reference numeral 1 indicates a hexagon nut shell with a central conical aperture 2, the latter widening upwards from the base of the nut shell. Into this aperture there is inserted a sleeve 3 having an outer conical surface 4 that exactly fits the conical surface of the nut shell, and an inner threaded surface 5 that forms the threaded portion of the nut. From the drawing it is clear that the sleeve 3, which has the shape of a truncated cone, is so dimensioned that its smaller surface does not reach the base or bottom surface of the nut, i. e. even when the nut is tightened up there always remains a clearance between said two surfaces. According to the invention the sleeve is compressible to a certain extent, grooves 6 and 7 being provided in the same. According to Figs. 1 and 2 the conical outer surface 4 of the sleeve 3 shows diametrically located grooves 6, while the threaded surface 5 of the sleeve shows diametrically located grooves 7 at an angular distance of 90° from the grooves 6. According to Fig. 3 the outer surface of the sleeve has a groove 6 and the threaded surface a groove 7, said grooves being located diametrically relative to each other. The number of the grooves as well as the angular distances between them can be varied in any suitable manner. The grooves may be straightly axial or oblique, and there may be more grooves in the outer surface than in the inner surface and vice versa. Figs. 4 and 5 show screw joints with bolts 8 connecting two objects 9 and 10, said objects, according to the drawing, consisting of plates. However, the invention may be applied to joints consisting of objects of any shape. According to Fig. 4 the bolt head and the sleeve are located on either side of the plates, and according to Fig. 5 the bolt head contacts with the sleeve 3, which engages a conical recess in the plate 9, the plate 10 serving as nut for the bolt 8. For the rest, corresponding elements are indicated by the same reference numerals throughout all figures.

It is obvious that the grooves 6 and 7 in the sleeve 3 make the same compressible to a certain degree, the effect of said compressibility being determined by varying the number and size of the grooves. Because of the compressibility of the sleeve the friction between the conical surfaces will be increased to a substantial value before the friction between the threads appears to any greater extent, and the friction between the conical surfaces will always be greater than that between the threads.

As indicated above, the details of the invention may be varied in one or more respects without going beyond the scope of the invention. The invention may be applied to nuts and screws of any sizes. Fig. 6 shows how the grooves may be provided only in the outer conical surface of the sleeve, all grooves being about equal as to width and depth.

Having now described my invention, what I claim as new and desire to secure by Letters Patent is:

1. A locking device for threaded bolt connections comprising an outer member having a recess therein presenting an internal uninterrupted frustro-conical surface, of circular cross-section, an internally screw threaded sleeve presenting an external frustro-conical surface complementary to and fitting said conical recess, said sleeve being of substantially the same axial length as said outer member, said sleeve having longitudinal grooves of less depth than its thickness, substantially throughout its length, to reduce the cross section thereof and thus to facilitate compression into tight engagement with the bolt by pressure exerted thereon by said outer member.

2. A locking device as recited in claim 1, wherein a plurality of grooves are formed in the outer conical surface of said sleeve.

3. A locking device as recited in claim 1, wherein a plurality of grooves are formed in the inner threaded surface of said sleeve.

4. A locking device as recited in claim 1, wherein grooves are formed in both the inner and the outer surfaces of said sleeve.

5. A locking device as recited in claim 1, wherein grooves are formed in both the inner and the outer surfaces of said sleeve, the grooves of the respective surfaces being angularly spaced from each other.

6. A locking device as recited in claim 1, wherein said outer member is a plate through which the bolt extends to engage a threaded member at the side of the plate opposite the conically recessed face thereof.

GUSTAF LAMBERT ERICSSON.